(12) United States Patent
Rattunde

(10) Patent No.: US 10,816,953 B2
(45) Date of Patent: Oct. 27, 2020

(54) METHOD FOR ADJUSTING THE ENERGY CONSUMPTION OF TWO TOOLS DURING THE MACHINING OF PIPE SECTION ENDS

(71) Applicant: RATTUNDE & CO GMBH, Ludwigslust (DE)

(72) Inventor: Ulrich Rattunde, Bentwisch (DE)

(73) Assignee: Rattunde AG, Ludwigslust (DE)

( * ) Notice: Subject to any disclaimer, the term of this patent is extended or adjusted under 35 U.S.C. 154(b) by 452 days.

(21) Appl. No.: 14/915,380

(22) PCT Filed: Aug. 27, 2014

(86) PCT No.: PCT/EP2014/068158
§ 371 (c)(1),
(2) Date: Feb. 29, 2016

(87) PCT Pub. No.: WO2015/028502
PCT Pub. Date: Mar. 5, 2015

(65) Prior Publication Data
US 2016/0209830 A1    Jul. 21, 2016

(30) Foreign Application Priority Data
Aug. 29, 2013   (DE) ................ 10 2013 109 407

(51) Int. Cl.
*G05B 19/406* (2006.01)
*G05B 19/416* (2006.01)
(Continued)

(52) U.S. Cl.
CPC .......... *G05B 19/406* (2013.01); *B23Q 15/12* (2013.01); *G05B 19/182* (2013.01);
(Continued)

(58) Field of Classification Search
CPC .. G05B 19/406; G05B 19/182; G05B 19/401; G05B 19/4163
(Continued)

(56) References Cited

U.S. PATENT DOCUMENTS 5,759,085 A * 6/1998 Gugenheimer ......... B24B 49/14
451/28
2006/0271231 A1   11/2006 Olgac
2008/0008549 A1 * 1/2008 Schawe .................... B23G 1/02
409/66

FOREIGN PATENT DOCUMENTS

DE          2208123 A    11/1972
DE          3348159 C2   12/1992
(Continued)

*Primary Examiner* — Mohammad Ali
*Assistant Examiner* — Joshua T Sanders
(74) *Attorney, Agent, or Firm* — Bay State IP, LLC

(57) ABSTRACT

A method for machining a longitudinal profile section having an actual length and a first and a second end, wherein the first and the second end are machined using respectively a first and a second tool head and material is continuously abraded by the first and second rotating tool head during a machining period, the machining period is divided into time increments ($\Delta$ti), a torque (M(ti,) M'(ti)) of the tool head is measured for each time increment ($\Delta$ti) and an individual energy consumption (E($\Delta$ti), E'($\Delta$ti)) is determined for each time increment ($\Delta$ti), said individual energy consumption corresponding to an individual quantity of material abraded during the time increment ($\Delta$ti), and a total energy consumption (E(t), E'(t)) both of the first and of the second tool head is determined from the individual energy consumptions (E($\Delta$ti), E'($\Delta$ti)), said total energy consumption corresponding to the total quantity of abraded material.

6 Claims, 2 Drawing Sheets

(51) Int. Cl.
*G05B 19/18* (2006.01)
*B23Q 15/12* (2006.01)
*G05B 19/401* (2006.01)

(52) U.S. Cl.
CPC ....... *G05B 19/401* (2013.01); *G05B 19/4163* (2013.01); *G05B 2219/50008* (2013.01); *G05B 2219/50015* (2013.01); *G05B 2219/50206* (2013.01)

(58) Field of Classification Search
USPC .......................................................... 700/174
See application file for complete search history.

(56) References Cited

FOREIGN PATENT DOCUMENTS

| | | |
|---|---|---|
| DE | 4318102 | 12/1994 |
| DE | 19637191 A1 | 4/1998 |
| DE | 102004052790 B3 | 10/2004 |
| JP | S59232745 | 12/1984 |
| JP | S60-62439 A1 * | 4/1985 |
| JP | S6062439 | 4/1985 |

* cited by examiner

METHOD FOR ADJUSTING THE ENERGY CONSUMPTION OF TWO TOOLS DURING THE MACHINING OF PIPE SECTION ENDS

CROSS REFERENCE TO RELATED APPLICATION

This application is for entry into the U.S. National Phase under § 371 for International Application No. PCT/EP2014/068158 having an international Application No. Aug. 27, 2014, and from which priority is claimed under all applicable sections of Title 35 of United States Code including, but not limited to, Sections 120, 363, and 365(c), and which in turn claims priority under 35 USC 119 to German Patent Application No. 10 2013 109 407.4 filed on Aug. 29, 2013.

The invention relates to a method for machining a workpiece.

Methods for machining workpieces, in particular in the form of longitudinal profile sections, have been known for a long time in the prior art.

Usually, workpieces are cut to size as pipe sections of pipes and the two ends of the pipe sections are subjected to a further treatment such as washing, chamfering or brushing. When chamfering the two ends of the pipe section that has been cut to size, an inside and outside chamfer and also a flat face are formed on each of the two pipe ends by means of a respective tool head. During the chamfering operation, the total length of the pipe is reduced from an actual length to a production length. The two ends should each have a completely smooth flat face and identical inside and outside chamfers. The quantity of material abraded from the flat face, the flat face oversize, should be as small as possible so that little material is wasted.

During the chamfering, the pipe section is clamped to prevent rotation. The production length is precisely determined by the distance between the two tool heads, which are able to move towards one another and away from one another. The problem here is that on the one hand the exact position of the pipe section in the clamping device may vary for each operating cycle, and on the other hand the ends of different pipe sections are never exactly the same. Tolerances therefore exist. According to the prior art, the two ends are machined simultaneously by two tool heads, wherein a pipe section having an actual length which is considerably too long in comparison to the production length is cut to size from the pipe. The pipe section which is considerably too long is clamped, and on both sides the tool head abrades material from the respective pipe end until the two tool heads are at a distance from one another corresponding to the production length. In this case, the actual length is large enough that the abovementioned tolerances are compensated, but at the expense of a greater quantity of material being abraded.

DE 19 637 191 A1 discloses a method in which, when machining a workpiece, a constant quantity of material per unit time can be abraded from the workpiece, wherein the rate of advance is controlled in such a way that, depending on the cutting volume, neither too much nor too little material is abraded at each point on the workpiece.

DE 33 48 159 C2 discloses a control device for a grinding machine, in which the machining performance level is continuously adjusted by varying machine control input variables and by outputting the control input signals in a time-variable and optimal manner as a function of changing operating parameters as the machining process continues.

DE 10 2004 052 790 B3 discloses a method for optimizing infeed values in NC programs of CNC-controlled machine tools.

DE 22 08 123 A discloses a control device for grinding machines, which provides improved control with regard to the actual final surface machining and roundness.

The object of the present invention is to provide a method for machining a longitudinal profile section having an actual length and two ends, which requires the abrasion of less material.

The object is achieved by a method as mentioned in the introduction, wherein, from the longitudinal profile section having an actual length and a first and second end, material is continuously abraded by respectively a first and a second rotating tool head during a machining period, preferably until the longitudinal profile section has reached a predefined production length. Here, the production length is shorter than the actual length. The machining period is divided into time increments, and a torque of each tool head is measured for each time increment, and for each time increment an individual energy consumption corresponding to the individual quantity of material abraded during the time increment is determined, and a total energy consumption corresponding to the total quantity of material abraded up to an instant is determined from the individual energy consumptions.

A time increment will be understood to mean a time interval. The time interval may be very short and may be for instance 0.001 to 0.01 seconds, preferably 0.006±0.001 seconds. The time increments may all have an identical length, or else different lengths.

An individual energy consumption will be selected as the individual variable corresponding to the quantity of abraded material. The individual energy consumption of a tool head correlates with the quantity of material abraded by the tool head during the time increment. A proportional, preferably linear, relationship exists. The relationship can be determined empirically.

Preferably, an angular velocity of the tool head is measured during each time increment and an individual energy consumption is determined by multiplication during the time increment from the angular velocity and the torque and the duration of the time increment.

The energy consumption is greatly dependent on the torque acting in each case. The angular velocity advantageously remains substantially constant throughout the entire machining operation or changes only slightly. However, it is also conceivable that the angular velocity changes considerably.

In one preferred embodiment of the invention, the individual energy consumptions of a tool head are summed and a total energy consumption of a tool head is determined. The total energy consumption makes it possible to determine the exact magnitude of the quantity of material abraded by an individual tool head. By determining the magnitude of the quantity of material abraded by an individual tool head, a machining which abrades particularly little material can be achieved by comparing the quantity of material abraded from two ends of a workpiece by two tool heads.

The total energy consumption will be understood to mean the entire energy consumption up to a given instant.

The longitudinal profile sections are in particular longitudinal profile sections made entirely of metal, in particular solid profiles or pipes.

Preferably, a workpiece is provided as a longitudinal profile section having an actual length and two ends and is further machined, in particular chamfered, by the method according to the invention. Each of the two ends is machined by a respective tool head. During the machining, a total energy consumption of each of the two tool heads is determined. The longitudinal profile section is shortened to a production length. If differences in the energy consumptions are ascertained, the two energy consumptions will be equalized. The equalizing preferably takes place only once the difference between the two total energy consumptions has exceeded a limit value.

It is provided here that the two tool heads abrade material from one and from the other end, and the ratio of the two quantities of material in successive operating cycles is identical, preferably remains precisely identical or is regulated to remain identical. In particular, it may be provided to abrade equal quantities of material from both ends of the longitudinal profile section in successive operating cycles, preferably each operating cycle. This is the case in particular when a flat face and an inside and outside chamfer at both ends of a longitudinal profile are configured identically and also remain so in successive operating cycles. If the two ends of a longitudinal profile have different inside and outside chamfers, the abrasion of material at both ends is different and has the aforementioned ratio of the two quantities of material. The ratio of the two quantities of abraded material is regulated to remain the same between successive operating cycles, in that the two energy consumptions have a ratio that remains constant or are regulated to a ratio that remains constant.

Preferably, the machining by the two tool heads is regulated in such a way that a minimal flat face oversize is abraded from the two ends. For this purpose, the longitudinal profile sections are machined between the two tool heads in such a way that the machining travel of the two tool heads, that is to say the distance travelled by the tool head during the machining, is minimal.

Preferably, the method symmetrizes the machining of the two ends of the longitudinal profile section. The two tool heads are controlled in such a way that, if the total energy consumption of one of the two tool heads is greater than that of the other tool head, the rate of advance of the other tool head in comparison to the one tool head is increased. In this way, a symmetrizing of the machining of the two ends of the longitudinal profile section can already take place during the machining of a longitudinal profile section within an operating cycle.

It is also preferably provided to carry out fully the machining of the longitudinal profile section, to compare the total energies of the two tool heads and to use the result of the comparison to vary the control, in particular the rate of advance of the two tool heads, for the machining of a next longitudinal profile section within a next, preferably immediately successive, operating cycle.

The two ends are machined by a respective tool head and the workpiece as a whole is brought to a production length which is determined by an associated distance between the two tool heads.

The longitudinal profile section is preferably a pipe section, and an inside chamfer and/or an outside chamfer and/or a flat face is formed in each of the two ends.

The invention will be described on the basis of an example of embodiment in three figures, in which.

Figure 1:
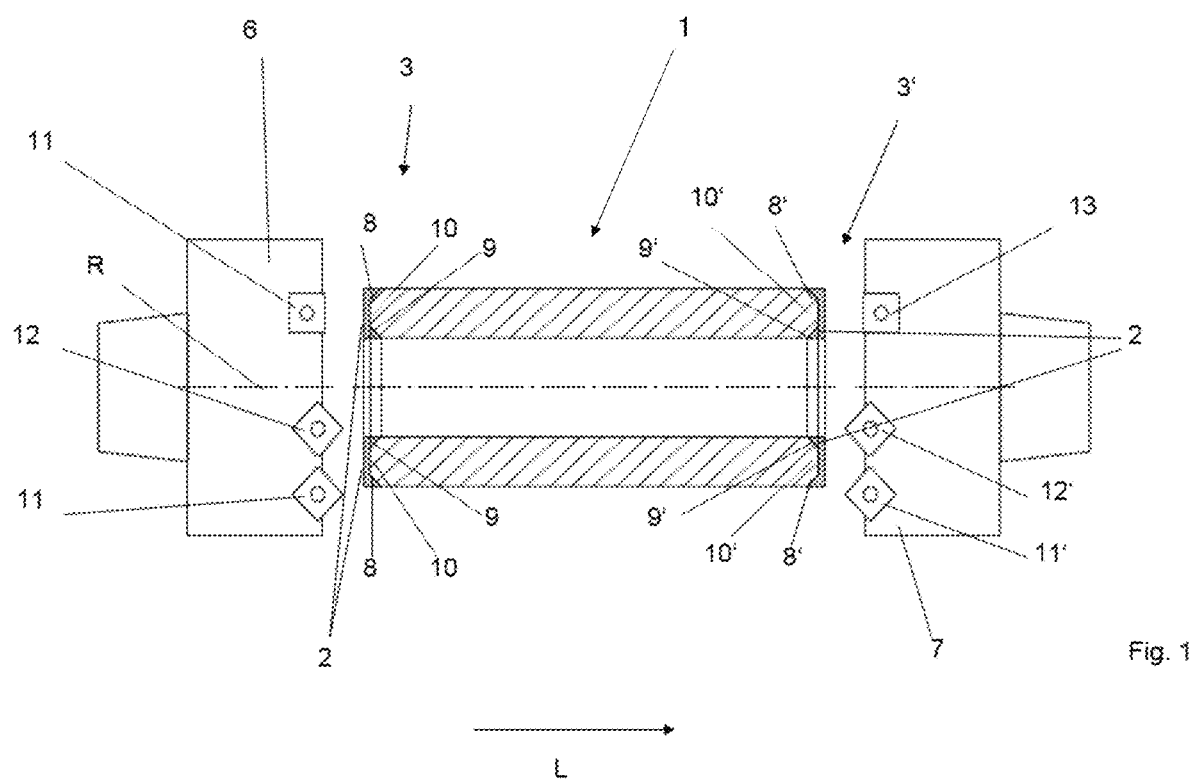
FIG. 1 shows a schematic side view of a pipe section and two chamfering heads.

FIG. 1 shows the pipe section 1 clamped in a clamping device (not shown). In the form shown by the outer rectangular border in the side view, the pipe section 1 is clamped with an actual length, and during a machining process material is abraded from a region 2 shown by hatching in FIG. 1 and the pipe section 1 is shortened to a production length.

The pipe section 1 is cut to size from a pipe by a pipe cutting machine. As a result of being cut to size, the pipe section 1 has sharp edges at its one pipe section end 3 and at its other pipe section end 3'. The pipe section 1 is cut to size in its actual length from the pipe, in particular by sawing or chopping. The actual length corresponds to the longitudinal extension of the pipe section 1 in its rectangular contour in a longitudinal direction L. After being cut to size, the pipe section 1 is machined by means of two tool heads 6, 7, which rotate simultaneously and in opposite directions on the same axis of rotation R. Each of the tool heads 6, 7 forms an outside chamfer 8, 8', an inside chamfer 9, 9' and a flat face 10, 10' on each of the two pipe section ends 3, 3'. By virtue of the machining of the two pipe section ends 3, 3' by means of the two tool heads 6, 7, the actual length is shortened to the desired production length L2, which is shorter than the actual length. The production length is achieved by a predefinable distance between the two tool heads 6, 7 at the end of the machining of the two pipe section ends 3, 3'. Each of the tool heads 6, 7 has three cutting plates 11, 12, 13 respectively 11', 12', 13' which, as shown in FIG. 1, by a rotational movement of the tool heads 6, 7, form the corresponding outside chamfer 8, 8', the inside chamfer 9, 9' and the flat face 10, 10' on the two pipe ends 3, 3' and in so doing abrade material from the two pipe section ends 3, 3'.

Figure 2:
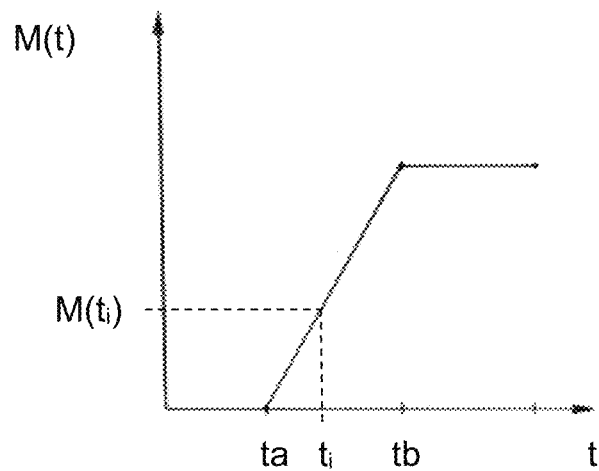
FIG. 2 shows a graph of the torque as a function of the chamfering duration at a constant angular velocity.

A drive of each of the two tool heads 6, 7 generates one torque M(t) and another torque M'(t) at the one pipe section end 3 and at the other pipe section end 3'. As shown in FIG. 2, the one torque M(t) initially acting on the one pipe section end 3 is zero when the associated tool head 6 is not in contact with the one pipe section end 3. As soon as contact takes place between the tool head 6 and the one pipe section end 3 at an instant ta, the one torque M(t) begins to act on the tool head 6. The further the tool head 6 penetrates into the material of the one pipe section end 3, the larger the surfaces of the one pipe section end 3 machined by the three cutting plates 11, 12, 13 become, and the acting one torque M(t) accordingly increases in a substantially linear manner as shown in FIG. 2. When the one pipe section end 3 at an instant tb has reached its desired external contour by chamfering, that is to say the inside and outside chamfer 9, 8 and the flat face 10 have the desired size, the one torque M(t) no longer changes. The surfaces machined by the tool head 6 have a constant size during the further machining period after the instant tb, so that the one torque M(t) remains constant from an instant tb onwards, as shown in FIG. 2. From the instant tb onwards, only the length of the pipe section 1 becomes shorter.

The same applies to the other pipe section end 3'. The above description applies in a corresponding manner to the other torque M'(t), the other inside chamfer 9', the other outside chamfer 8' and the other flat face 10', which are produced by material being abraded from the other pipe section end 3' by the cutting plates 11', 12', 13'.

It is problematic to keep the abrasion of material as low as possible. Once the external contour has been achieved at the instant tb, the two torques M(t), M'(t) do not give any indication as to how far the one or the other tool head 6, 7 is advanced into the respective pipe section end 3, 3' in the longitudinal direction L or respectively counter to the longitudinal direction L.

Figure 3:
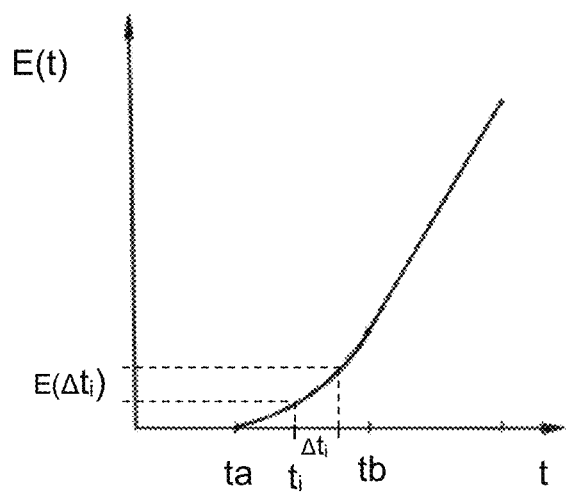
FIG. 3 shows a graph of the energy as a function of the chamfering duration at a constant angular velocity.

According to the invention, for the machining of the one pipe section end 3, a total energy consumption E(t) up to a machining instant t is determined. The total energy consumption E(t) is shown in FIG. 3. It changes continuously throughout the entire machining period, by increasing in a monotonous fashion. The total energy consumption E(t) at the instant t correlates with an abrasion of material at this instant t. Since the two pipe section ends 3, 3' are machined simultaneously, the one E(t) and another total energy consumption E'(t) up to the instant t are determined. The comparison of the two total energy consumptions E(t), E'(t) is a criterion for the extent to which the two pipe section ends 3, 3' are being machined symmetrically, that is to say the extent to which an equal quantity of material is being abraded from the two pipe section ends 3, 3'. The aim is to achieve the most equal possible quantity of abraded material from the two pipe section ends 3, 3' at the end of the machining period.

The determination of the one total energy E(t) will be explained on the basis of the one tool head 6. It can be transferred analogously to the other tool head 7 by replacing the corresponding reference signs.

Individual energy consumptions $E(\Delta t_i)$ are determined during different time increments $\Delta t_i$, i=1, ..., n. The time increments $\Delta t_i$ may all have the same length or else different lengths. The time increments $\Delta t_i$ in this example of embodiment all have an identical length of $\Delta t_i = 0.006$ sec. The individual energy consumptions $E(\Delta t_i)$ during the time increment $\Delta t_i$ are determined by determining a torque $M(t_i)$ of the tool head 6 during the time increment $\Delta t_i$. The torque $M(t_i)$ is measured at an instant $t_i$ within the very short time increment $\Delta t_i$. The torque $M(t_i)$ is substantially constant during the time increment $\Delta t_i$. In addition to the torque $M(t_i)$, an angular velocity $\omega(t_i)$ is determined at the instant $t_i$ during the time increment $\Delta t_i$. Also with regard to the angular velocity $\omega(t_i)$, it is the case that this is substantially constant throughout the duration of the time increment $\Delta t_i$ and the instant $t_i$ can again here be selected at will within the short time increment $\Delta t_i$.

The one torque M(t) can be determined in the motor or by means of a torque meter on the rotating tool head 6 itself, and the individual energy consumption $E(\Delta t_i)$ during the time increment $\Delta t_i$ is determined from the torque $M(t_i)$ at the respective instant $t_i$ and the angular velocity $\omega(t_i)$ at the instant $t_i$, according to the equation $E(\Delta t_i) = M(t_i) * \omega(t_i) * \Delta t_i$.

The one total energy consumption E(t) up to the instant t is obtained by summing the individual energy consumptions $E(\Delta t_i)$ according to the equation $E(t) = \Sigma_{i=3}^{n} M(t_i) * \omega(t_i) * \Delta t_i$ where $t = \Sigma_{i=0}^{n} \Delta t_i$ and n-measurements of torque $M(t_i)$ and angular velocity $\omega(t_i)$. The one total energy consumption E(t) required up to the instant t correlates with the quantity of material abraded from the one pipe section end 3. A correlation between total energy consumption E(t) and abraded quantity of material can be determined empirically and/or numerically.

In an analogous manner, the total energy consumption E'(t) of the other tool head 7 is determined at the same time. The two total energy consumptions E(t), E'(t) are compared with one another and, if they differ from one another, the rate of advance of the tool head 6, 7 consuming more total energy E(t), E'(t) is reduced in comparison to the tool head 6, 7 consuming less total energy E(t), E'(t) until the total energy consumptions E(t), E'(t) have again equalized. For this purpose, an electronic control of the two tool heads 6, 7 is provided, which is connected to an evaluation unit for evaluating the two total energy consumptions E(t), E'(t).

Overall, so much material is abraded that the pipe section 1 is shortened from the actual length to the production length.

LIST OF REFERENCES

1 pipe section
2 region
3 pipe section end
3' pipe section end
6 one tool head
7 other tool head
8 one outside chamfer
8' other outside chamfer
9 one inside chamfer
9' other inside chamfer
10 one flat face
10' other flat face
11 one cutting plate
12 other cutting plate
13 one cutting plate
11' other cutting plate
12' other cutting plate
E(t) one total energy consumption
$E(\Delta t_i)$ individual energy consumptions
E'(t) other total energy consumption
$E'(\Delta t_i)$ other individual energy consumptions
L longitudinal direction
L1 actual length
L2 production length
M(t) torque
M'(t) other torque
$M(t_i)$ one torque at the instant $t_i$
$M'(t_i)$ other torque at the instant $t_i$
$\omega(t_i)$ one angular velocity at the instant $t_i$
$\omega'(t_i)$ other angular velocity at the instant $t_i$
R axis of rotation
t instant
ta instant
tb instant
$t_i$ instant
$\Delta t_i$ time increment

The invention claimed is:

1. A method for machining a longitudinal pipe section (1) having a first and a second end (3, 3'), comprising the steps of:
   utilizing a first and second rotating tool head (6, 7) to machine the first and the second end (3, 3'), wherein the first and second tool head rotate simultaneously and in opposite directions on a same axis of rotation R and each of the tool heads (6, 7) forms an outside chamfer (8, 8'), an inside chamfer (9, 9') and a flat face (10, 10') on each of the two pipe section ends (3, 3');
   abrading a material continuously by the first and second rotating tool head (6, 7) during a machining period (t);
   dividing the machining period (t) into time increments ($\Delta t_i$);
   measuring a torque ($M(t_i)$, $M'(t_i)$) of the first and second rotating tool head (6, 7) for each time increment ($\Delta t_i$);
   determining an individual energy consumption ($E(\Delta t_i)$, $E'(\Delta t_i)$) for each time increment ($\Delta t_i$), wherein said individual energy consumption corresponds to an individual quantity of material abraded during the time increment ($\Delta t_i$); and determining a total energy consumption (E(t), E'(t)) of both the first and of the second rotating tool head (6, 7) from the individual energy consumptions (E(Δti), E'(Δti)), wherein said total energy consumption corresponds to the total quantity of abraded material;

adjusting the total energy consumptions (E(t),E'(t)) to a predefined ratio;

wherein the abraded quantity of material of the first and second end (3, 3') is determined continuously; and wherein the first and second rotating tool heads (6, 7) are controlled that when the total energy consumption E(t) of the first tool head (6) is greater than the total energy consumption E' (t) of the second tool head (7), the rate of advance of the second tool head (7) is increased in comparison to the first tool head (6) and in that an angular velocity ω(ti), ω' (ti) of the tool head (6, 7) is measured during each time increment Δti and an individual energy consumption (E(Δti),E'(Δti)) during the time increment (Δti) is determined from the angular velocity ω(ti), ω' (ti) and the torque (M(ti), M'(ti)) and the duration of the time increment (Δti).

2. The method of claim 1, further comprising the step of: determining a total energy consumptions (E(t), E'(t)) of each of the tool heads (6, 7) by summing the individual energy consumptions (E(Δti)), E'(Δti)) of each of the tool heads (6, 7) and determining a total energy consumption (E(t)), E'(t)) of each of the tool heads (6, 7).

3. The method of claim 2, wherein the two total energy consumptions (E(t)), E'(t)) are adjusted to be equal.

4. The method of claim 1, wherein the longitudinal pipe section (1) is machined symmetrically at its two ends (3, 3').

5. The method of claim 1 further comprising the step:

determining in each case the total energy consumptions E(t), E' (t) of each of the two tool heads 6, 7 during one operating cycle;

wherein when the two total energy consumptions E(t), E' (t) differ from one another, the longitudinal pipe section (1) machined in the next working cycle is machined taking into account the total energy consumptions E(t), E' (t) of the operating cycle and reducing the difference between the total energy consumptions E(t), E' (t).

6. The method of claim 1, wherein the longitudinal pipe section comprises:

a pipe section (1); and an inside chamfer (9, 9') and/or an outside chamfer (8, 8') and/or a flat face (10, 10') is abraded at the two ends (3, 3').

* * * * *